United States Patent [19]

Reichenbach et al.

[11] 4,249,874
[45] Feb. 10, 1981

[54] INSERT MOLDING APPARATUS WITH MOVABLE FLASH BARRIER

[75] Inventors: Jerry D. Reichenbach, Carpentersville; Keith W. Christiansen, Fox River Grove, both of Ill.

[73] Assignee: CR Industries, Elgin, Ill.

[21] Appl. No.: 80,542

[22] Filed: Oct. 1, 1979

[51] Int. Cl.² ............................ B29F 1/00; B29D 3/00; B29H 9/00
[52] U.S. Cl. ............................ 425/127; 425/DIG. 47
[58] Field of Search ......................... 425/DIG. 47, 127

[56] References Cited

U.S. PATENT DOCUMENTS

| | | | |
|---|---|---|---|
| 3,475,790 | 11/1969 | Bush et al. | 425/DIG. 47 |
| 3,773,454 | 11/1973 | Howe et al. | 425/DIG. 47 |
| 3,841,809 | 10/1974 | Tucker | 425/DIG. 47 |
| 3,936,257 | 2/1976 | Christiansen et al. | 425/DIG. 47 |
| 3,950,119 | 4/1976 | Reichenbach | 425/DIG. 47 |

Primary Examiner—J. Howard Flint, Jr.
Attorney, Agent, or Firm—James T. FitzGibbon

[57] ABSTRACT

A molding press for insert molding of composite articles. The press has upper and lower plates movable between open and closed positions, and a die set positioned between the plates. The die set includes a core member with surfaces defining a portion of the molding cavity and another surface for receiving and supporting the insert. The core member also includes means defining a part of an area for receiving a charge of curable material and a part of a scrap forming cavity. A second mold member has surfaces defining a second portion of the article forming cavity and a second portion of said strap forming cavity, and the second mold member also includes means for engaging the insert and cooperating with it to form an axially movable flash barrier. The second mold part also has means cooperating with the insert to form a second, stationary flash barrier on an angularly related surface of the insert. The third mold member is adapted to reciprocate relative to the first and second members and has one surface for engaging a portion of said charge of moldable material for moving it from the receiving area through the scrap forming area and into the molding cavity. The first and third elements also include surfaces lying opposite each other in the closed position of said mold which serve to define a slightly spaced apart, substantially circumferentially continuous passage of reduced cross-section which separates scrap forming area from the article forming cavity. The second and third mold members are resiliently urged, in the closed position of the mold towards the first member by separate sets of resilient means interposed between portions of the second and third members and portions of the top mold plate. The method includes establishing a movable flash barrier by engaging an axial insert surface during mold closure. A seal with a unitary body, having two or more lips and a deep axial cross-section, is also described.

12 Claims, 9 Drawing Figures

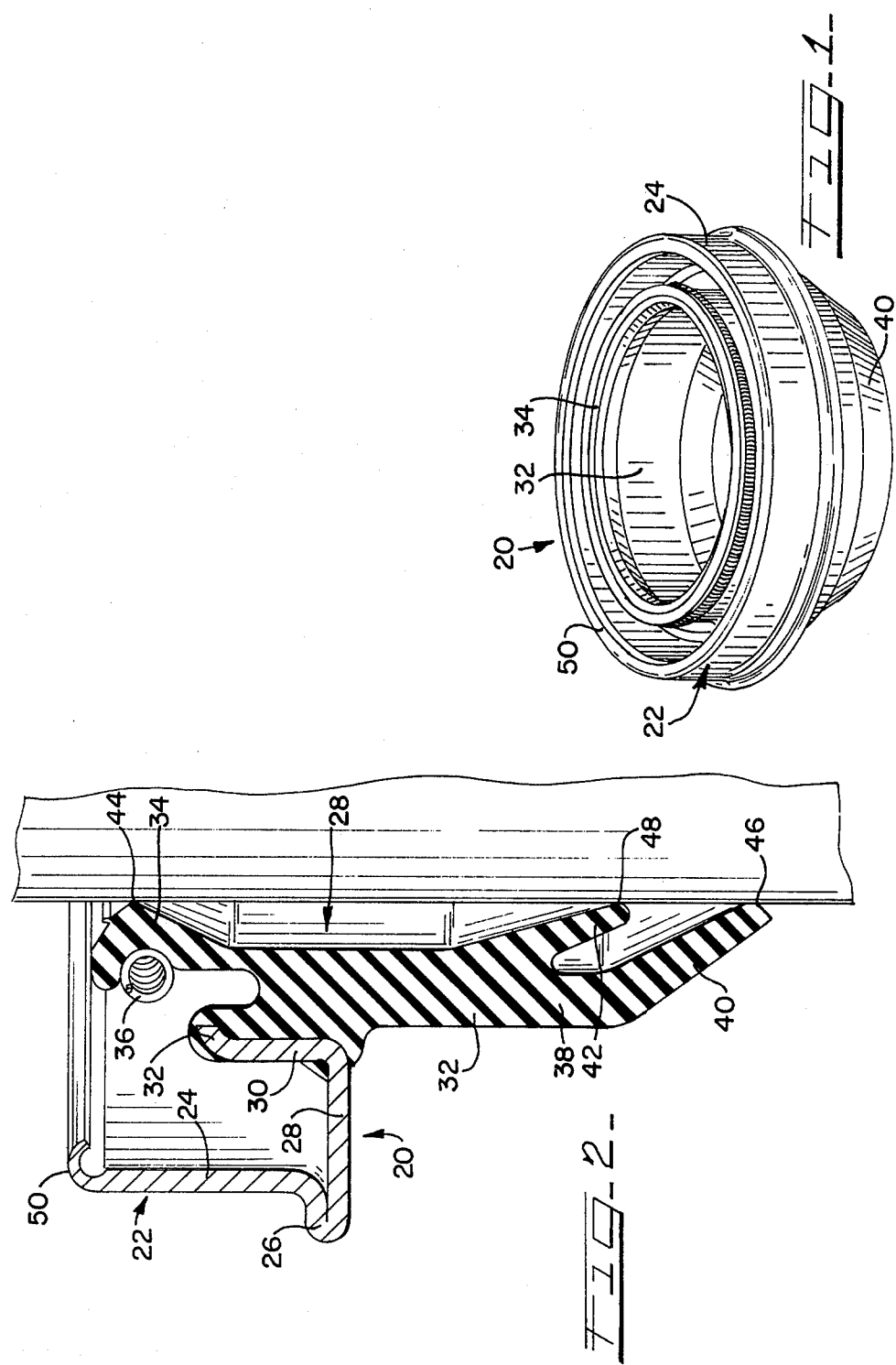

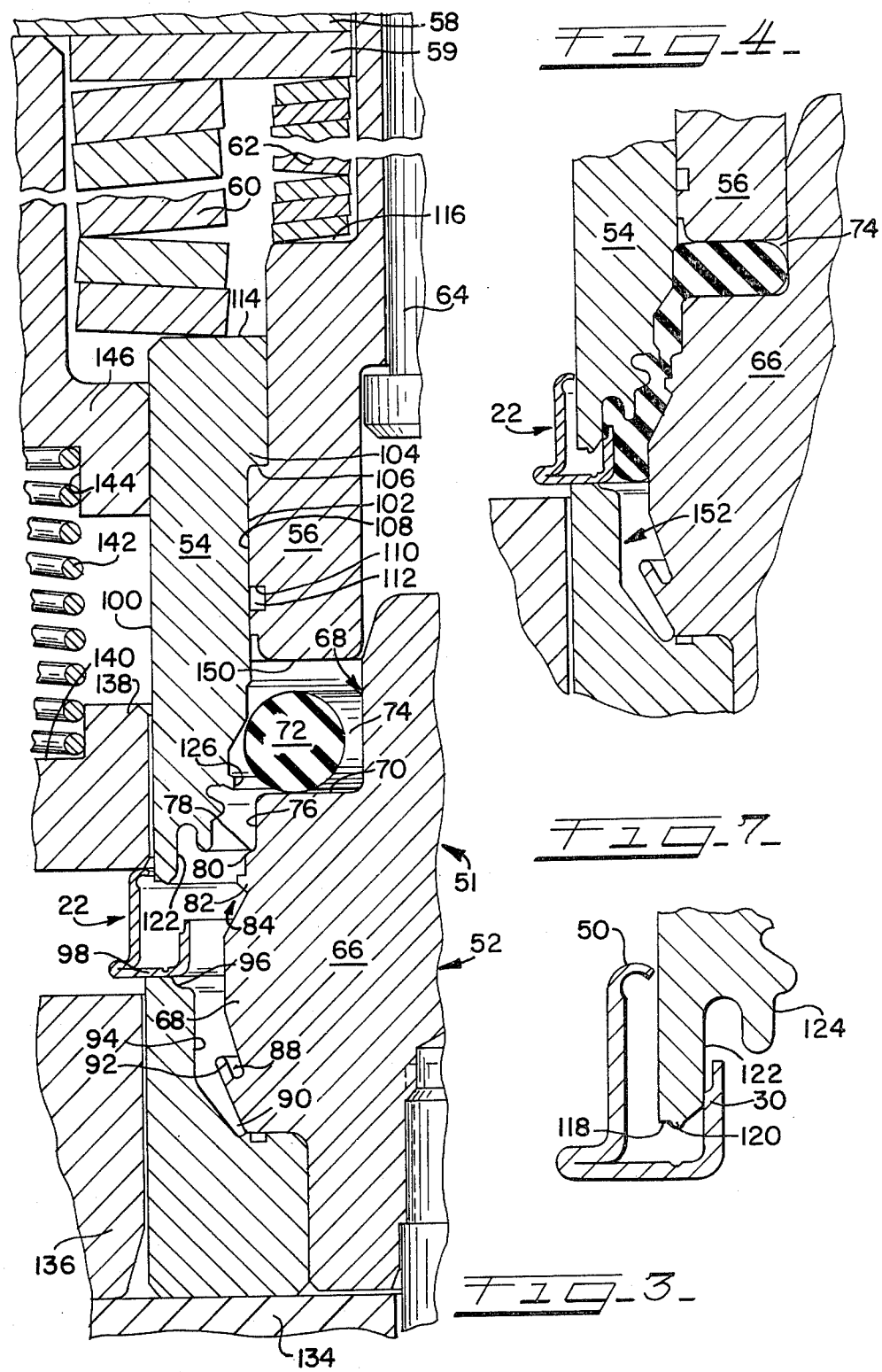

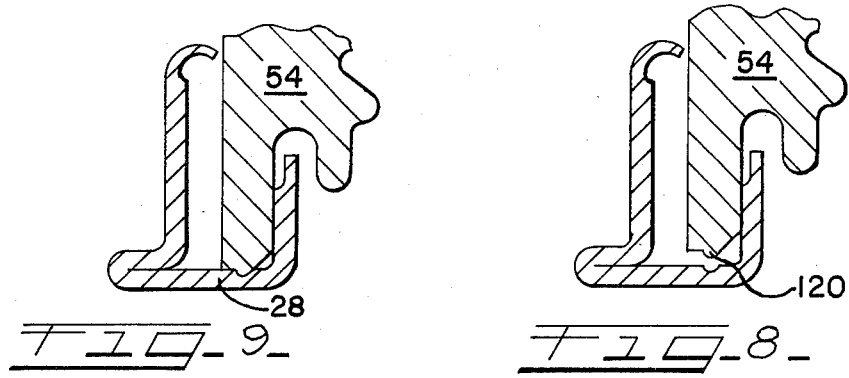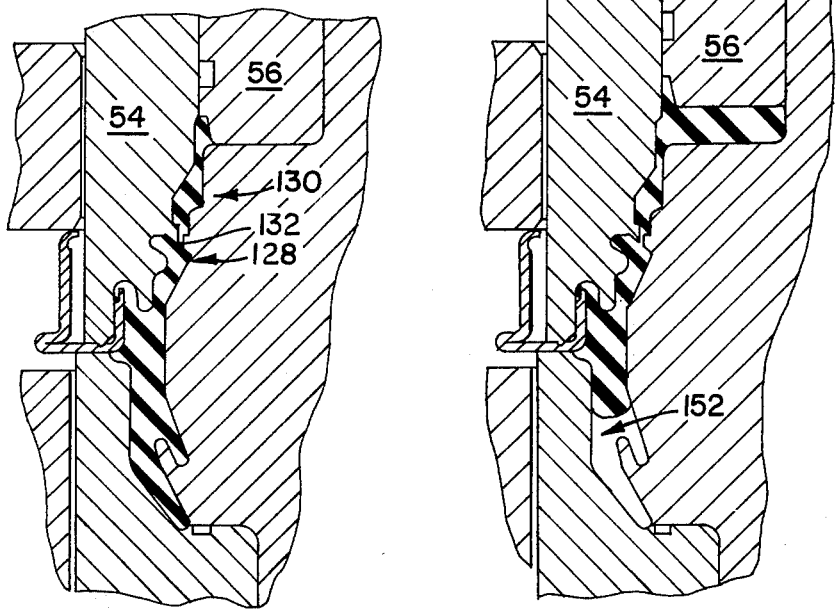

INSERT MOLDING APPARATUS WITH MOVABLE FLASH BARRIER

The present invention relates generally to so-called insert molded products, and more particularly, to oil seals comprised of a casing portion and a molded elastomeric portion, and having seal body portion of a novel configuration. In another aspect, the invention relates to apparatus for precision insert molding of composite articles. By insert molding is meant the process of shaping a fluent, moldable material such as rubber or the like and at the same time, bonding such material to a separate part made from a dissimilar material, such as a metal mounting flange or casing. The method of the invention is particularly advantageous when used in the manufacture of precision oil seals.

While most oil seals are able to be manufactured to highly precise tolerances, at acceptable speeds in known equipment, there are some seal units which, because of their configuration, are assembled into a complete unit only after the individual parts have been made in separate processing operations. Naturally, it would be desirable, if possible, to manufacture these seals in a single operation adapted to produce a unitary part. Likewise, there are also oil seals having certain design features which, while attractive from a performance standpoint, are not in use because they are not able to be made as a practical matter by known process technology.

While such seals may differ from one another in detail, they are generally characterized as having a long or deep, thin cross-section or deeply undercut surface. Other difficult-to-manufacture designs include those wherein a thin elastomeric portion of the seal is not backed by or adhered to any part of the stamping which would thereby add structural strength to the part.

Referring again generally to process technology, one chronic problem in oil seal manufacture is the creation of finished products which are characterized by an unsightly flash, that is, a bit of scrap formed by leakage of the rubber from the area in which it is intended to be confined into adjacent areas, usually along a part of the metal insert, casing or stamping part of the manufactured product. In the case of oil seals, it is usually necessary to remove such material, in an extra finishing operation. If the material is not removed, it can fall into the sealed mechanism and damage it.

A perhaps even more important, but sometimes less well understood problem is that flash or leakage of rubber from the molding cavity is sometimes indicative of problems which may create poor finished products. Where parts are being made by compression molding, flash is indicative of leakage which in turn may prevent buidup of maximum pressure during the molding operation. The part or parts of the mold which serve to define the outer boundaries of the rubber metal interface are often referred to as "flash barriers". Because rubber curing is an exothermic reaction and one which creates gases and like reaction products, if the rubber is not maintained in a closely confined, high pressure environment until the curing cycle is complete, the resulting product will be porous and improperly finished. However, if conditions of excess pressure exist, the rubber may be forced to leak or "flash" from the mold.

As a consequence, it has been a common practice in the art to provide different forms of equipment and apparatus designed to prevent flash. Some of these proposals have been more or less successful, while others have been successful in some respects but not in others.

Certain methods, for example, have involved the deformation of the metal stamping, permitting it to bend in certain regions as the mold closes, thereby eliminating flash while permitting the mold, in effect, to continue closing until the parts assume the shape of the molded product. While this method usually prevents flash, the requisite local deformation of the metal sometimes causes a corresponding unwanted deformation in other areas, thereby deforming the entire casing and, in the case of oil seals, making it difficult to insert them in a machine counterbore.

Other molding methods and apparatus have been successful which involve the application of two relatively movable members to establish the molding cavity, one of which is advanced into contact with a seal line around part of the associated stamping, with the other part being movable relative to the first and operating to move the "prep" or prepared specimen of rubber from which the finished product is made from a loading area into the molding cavity. This method and apparatus has proven highly successful, but its application is sometimes limited by the shape of the final cavity, with its use being confined to applications wherein the seal or like product possessed a compact profile. In these prior art mold constructions, one principal focus was on the length of the so-called closed mold stroke which could be obtained. This expression refers to the relative distance traveled by the mold parts which ultimately form the seal cavity after the flash barrier is formed but before all the rubber is transferred from the loading area to the cavity. The earlier methods used to obtain a closed mold stroke offered minimal distance or travel, while later methods afforded a somewhat greater but still limited length of closed mold stroke. The present invention is concerned with forming annular parts having a significant axial extent and is therefore concerned with obtaining a relatively long closed mold stroke without the disadvantages accompanying other molding methods intended for this same general purpose.

In view of the above drawbacks of the prior art and the need for improved molding apparatus, it is an object of the present invention to provide an improved apparatus for manufacturing precision insert molded parts.

Still another of the invention is to provide a form of modified compression mold which provides a relatively long closed mold stroke, rendering the molding apparatus capable of making flash-free parts of relatively deep, complex contour.

A still further object of the invention is to provide a molding apparatus having the molding cavity formed at least in part by a stationary member and two relatively movable members, with one relatively movable member moving into a position to establish a flash barrier during an early portion of the closing movement sequence of the mold, and with the other member continuing to move relative to the first two members as the mold moves throughout the last part of its closing cycle or sequence.

Yet another object is to provide an apparatus for precision insert molding of composite parts wherein a relatively fixed and two relatively movable mold parts are provided, with the two movable parts being urged into position by a movable mold plate through first and second resilient means, each having a different spring rate and each being associated with one of the two movable elements, and with one movable element having a portion adapted to engage and travel along an axial surface of the insert to provide a flash barrier during mold closing.

Another object of the invention is to provide a molding apparatus having a molding cavity defined by a portion of the insert partially received within the cavity, by a stationary mold part and by at least one of two movable mold parts, with flash barriers being established along an axial surface of the insert as the mold is closed, and with the mold part cotaining the flash barrier also engaging an angularly related surface of the insert when the mold is fully closed.

A still further object is to provide a molding apparatus which is adapted to cooperate with specially formed casings or other units to which a fluent, moldable material is bonded during processing, with such casings each having a pair of angularly related surfaces adapted to be engaged by respective portions of the molding apparatus during closure thereof so as to establish flash barriers along at least one such surface so as to provide relatively long travel of the movable mold parts in relation to the stationary molding member.

Another object of the invention is to provide a molding apparatus which includes a movable mold member having a portion adapted to engage one surface of the insert during the mold closing stroke and to embody means for insuring that the molding cavity will be fully filled with a fluent, moldable material which in turn will be held under a predetermined pressure during the molding operation.

A still further object is to provide a molding apparatus which permits parts of deep axial cross-section to be molded without creating flash during the molding process.

Yet another object is to provide an apparatus for flashless molding which permits the "prep" or prepared portion of moldable material to vary within relatively wide limits without compromising the quality of the finished product.

A still further object is to provide a molding apparatus which is adapted to insure that pressure conditions present in the mold during the molding operation can be carefully regulated.

Another object is to provide a molding apparatus which will insure that the mold will be completely filled with the elastomer or other moldable material; which will not damage the part or create flash if the charge of moldable material is too large; and in which the mold parts are constructed and arranged so as to facilitate separation of the finished product from the scrap or trim created during molding.

A still further object is to provide a molding apparatus adapted for flashless molding wherein a product of relatively deep axial cross-section may be finished molded in a single operation such that the molded product does not require trimming or cutting to achieve its desired final configuration.

Yet another object of the invention is to provide an apparatus for flash-free insert molding of composite articles, including an apparatus wherein a charge or "prep" of fluent, moldable material may be moved from a loading region such as an annular shoulder, into a molding cavity so as to completely fill the same during the time another relatively movable member is engaging a casing received within the mold so as to hold the casing against movement and so as to establish a flash barrier during a relatively great extent of axial movement of the mold parts during the mold closing sequence.

A still further object of the invention is to provide a molding apparatus which includes one mold member having both a flash barrier forming surface and an insert hold-down surface, with another member acting as a plunger or pressing member adapted to engage a prepared charge of moldable material and force it from a loading area into the mold cavity, with both of such members being separated only be a working clearance and being mounted for movement relative to each other, with both members being movable in response to the movement of a mold plate and with each of such members having its own associated spring package so that the force able to be applied to the insert and the moldable material is limited by the resilience of the springs.

These and other objects and advantages of the invention are achieved in practice by providing a molding apparatus which includes at least one stationary mold member and at least two relatively movable members, the interior surfaces of at least two of which define the contours of the article to be molded, and which are adapted to receive therebetween an insert extending at least partially within said molding cavity, with one of the movable members which includes the cavity-defining surfaces being adapted to engage, during its closing movement sequence, a radially facing, axially extending surface on the insert, and subsequently to engage a radially extending, axially facing flange on such insert, with the other relatively movable part being adapted to engage and move a charge of fluent moldable m material from a storage area into the molding cavity as the mold is completely closed, whereby articles of relatively great axial length and complexity may be formed without leakage or flash from molding cavity along parts of the insert to which the moldable material is bonded.

The exact manner in which these and other objects of the invention are achieved in practice will become more clearly apparent when reference is made to the following detailed description of the preferred embodiments of the invention set forth by way of example, and to the accompanying drawings, wherein like reference numbers indicate corresponding parts throughout the several figures.

BRIEF DESCRIPTION OF THE DRAWINGS

FIG. 1 is a perspective view of an oil seal incorporating the advantages of the invention and made by the novel apparatus;

FIG. 2 is a fragmentary vertical sectional view, on an enlarged scale, of one form of oil seal made according to the invention and showing the extreme axial extent and thin cross-section of the rubber seal body portion;

FIG. 3 is an enlarged fragmentary vertical sectional view of a mold assembly made according to the invention and showing the same in a fully open position, after loading the "prep" but prior to beginning the closing stroke;

FIG. 4 is a fragmentary vertical sectional view similar to that of FIG. 3 and on a somewhat reduced scale, showing the movable mold parts as one part starts to engage an upper surface of the insert;

FIG. 5 is a view similar to that of FIG. 4, showing the outer mold part in a somewhat lower position than that of FIG. 5;

FIG. 6 is a view similar to those of FIGS. 4 and 5 but showing the mold in a fully closed position, with the molded article having its final configuration and with the flash barrier and plunger members being in the fully lowered or closed positions thereof;

FIG. 7 is a vertical sectional view on a greatly enlarged scale, showing the contact between one portion of the outer movable mold element and an axial surface on the seal casing to establish a moving flash barrier;

FIG. 8 is a view similar to that of FIG. 7 and showing the same parts with the mold member in a further downward position; and FIG. 9 shows the mold parts of FIGS. 7 and 8 in the lowermost or closed position thereof.

DESCRIPTION OF THE PREFERRED EMBODIMENTS OF THE INVENTION

While the apparatus of the present invention is adaptable to a number of applications and uses, one advantageous use thereof is in the manufacture of oil seals, with such oil seals being sometimes of a novel configuration insofar as they are made in a single operation rather than in multiple operations.

Accordingly, a detailed description of the invention will be made wherein the article to be molded is a composite, rubber and metal oil seal used for sealing the tail shaft of an automotive transmission, and wherein the mold comprises three principal mold members as well as resilient means adapted to control the engagement and movement of the movable mold members in relation to the mold closing plate and the insert and the stationary mold members.

Referring now to the drawings in greater detail, FIG. 1 shows an oil seal generally designated 20, made according to the invention and shown to include exterior casing generally designated 22 and having an axially extending seal mounting outer flange 24, a rim portion 26 formed at a fold line in the casing, a radial flange 28, and a radially inner, axially extending flange 30 terminating at its axially inner edge at an inwardly directed partial or stub flange 32. Because the casing or stamping 22 resembles a rim-fire shaped shotgun shell case, this casing is sometimes referred to in the industry as a "shotgun" casing. The seal also includes an elastomeric seal body generally designated 28, having a primary seal lip 34 urged radially inwardly by a circumferentially extending garter 36, and a tail or extension body portion 38.

As shown in FIG. 2, a pair of extension body seal lips 40, 42 may be provided to act as so-called secondary seals, sometimes referred to as dust or exclusion lips, for the purpose of preventing foreign matter from reaching the vicinity of the primary seal lip 34. Each of the lips 34, 40 and 42 includes its own inner shaft-contacting surface or seal band 44, 46, 48.

Referring again to the casing 22, the outer axial flange 24 also includes its own curl 50 at the axially inner end thereof. As used herein, the term "axially inner" refers to elements lying in the direction of the sealed medium, usually the oil, and in this case, such direction would be to the right as shown in FIG. 3. In the form shown, the shotgun casing not only provides processing advantages, as will appear, but also acts as its own depth gauge so that when the seal is inserted in the intended application, the rim 26 bottoms out on the shoulder in the associated counterbore, thus insuring that the seal is installed properly to specifications. The flange 50 aids in centering the seal for installation, and the flange or curl 32 is useful in manufacturing the seal, as will appear.

Referring now to the construction of the mold, FIG. 3 shows the preferred form of molding apparatus generally designated 51 and made according to the invention.

As shown, this mold 51 includes three principal mold parts, a stationary or first mold core member generally designated 52, a second, relatively movable, radially outer mold member 54, and a radially inner third member 56. The core member 52 receives and supports the "prep" or prepared charge of moldable material, and forms parts of the contour of the finished molded article. The second or outer member 54 acts as a movable, flash-barrier-forming member which also serves to hold down the casing 22 in the closed position of the parts and which further serves to define some or all of the remainder of the shape of the molded article.

The third member 56 is sometimes referred to as a plunger or pressing member which serves to force the rubber from the reception or storage areas through the transfer area and into the molding cavity per se. The second mold member 54 is resiliently urged into a closed position by an upper mold plate 58 acting through a resilient means in the form of a spring package 60. The upper mold plate 58 also acts on the plunger unit 56 through a second spring package 62, while a spacer 59 is interposed between the plate 58 and the spring packages 60, 62. The plunger is secured to the upper mold plate 58 for limited resilient movement by a large central fastener 64.

Referring now in detail to the core or stationary first mold part, this unit is shown to include a main body portion 66, having an upper, outwardly directed axial surface 68, which, in combination with the radial surface 70 forms a shoulder to receive a "prep" or preparation of moldable material 72 in the prep reception area 74. The lower mold part member 66 also includes a downwardly extending transfer surface 76, an inclined surface 78, a picking shoulder 80 and a tear trim passage defining surface 82. Therebelow is an annular, V-shaped notch or groove generally designated 84 which will form the seal band area of the primary sealing lip of the seal 20.

A long, axially extending, somewhat tapered surface 86 extends therebelow, terminating in a pair of annular grooves 88, 90 separated by a circumferential flange 92. The radially outer part of the lower mold member includes an upwardly directed, two element surface 94 which terminates in a shoulder 96 which is in turn surmounted by a casing support surface 98. In the form of mold shown, the lower mold member 52 remains stationary while the other elements move relative thereto. It will be understood, however, that the motion is relative and that the invention could be practiced using these parts in a reverse sense or relation.

Likewise, the mold is shown as being one wherein the "prep" flows downwardly from an upper area, whereas the flow direction might be opposite if desired. Still further, the lower or stationary mold member is sometimes referred to as a single unit in view of its function. It may, however, be made from two or more individual elements secured together as a unit.

Referring now to the second and third mold members 54, 56, the second member 54 includes an axially extending outer cylindrical surface 100, an inner locating surface 102, and a shoulder 104 adapted to engage a counterpart shoulder 106 on the pressing member 56. The locating surface 102 engages an oppositely directed surface 108 on the pressing member 56 with the two surfaces being in opposed sliding relation and separated from each other by a working clearance. A groove 110 containing a seal member 112 formed in the member 56 provide a seal between these parts.

Referring now to the upper ends of the second and third members respectively, these ends include radial surfaces 114, 116 for engagement with the lowermost elements of the spring packages 60, 62.

Referring now to FIG. 7, the lower portion of the second or flash barrier forming member 54 is shown to include a lower surface 118, with a circumferentially extending land 120 thereon adapted to engage the radial flange 28 on the seal unit 20. The radially inwardly directed axially extending surface 122 is adapted to engage the radially outwardly directed surface of the axially extending inner casing flange 30 with a snug but sliding fit to form a flash barrier. The lower part of the mold member 54 also includes a plurality of contoured lower surfaces 124 adapted to form the shape of the finished seal product, such as the spring groove, etc., and also additionally includes a surface 126 adapted to cooperate with its counterpart to form a thin passage defining a so-called tear trim area, best illustrated at 132 in FIG. 6.

Referring now in particular to FIG. 6, the mold is shown in a completely closed position with the surfaces just described being seen to define the contours of the seal in a lower or cavity-forming portion generally designated 128, which the scrap or sprue in an area generally designated 130, and with the small tear trim area 132 extending therebetween.

As is known in the art, when the outer movable mold member 54 rises vertically after the part has been formed, the shoulders formed by the surfaces defining the tear trim area serve to hold the rubber to facilitate separation of the scrap from the final form of the molded lip seal product.

Referring again to the molding unit 51, other parts of this apparatus are relatively conventional including the lower mold plate 134, an outer ring element 136, a hold down ring 138 including a pocket 140 for receiving a hold down spring 142, the upper portion of which is received in a pocket 144 in the upper hold down mount 146. The top mold plate 58 of the press extends across the entire unit and also locates the spacer 59.

Referring now to the operation of the mold in use, it will be assumed that the press is in an open and loaded position such as that shown in FIG. 3 and that the product is ready to be manufactured. A "prep" or prepared portion 72 of rubber or other moldable material is inserted in the material receiving area 74 and rests atop the surface 70. The casing 22 is placed in the mold and situated atop the supporting surface 98 of the mold core 66. As the press begins its downward stroke, the outer surface 100 of the member 54 centers and passes within the curl or reduced diameter portion 50 of the stamping, and the mold continues to close.

At this point, the members 54, 56 have the shoulder portions 104, 106 thereof mutually engaged and these elements are moving down together as a unit. After a limited amount of downward movement, the lower surface 150 of the plunger member 56 engages the "prep", and meets with a certain amount of resistance. The members continue to travel together downwardly, and following engagement of the surface 150 with the prep 72, the material begins to be transferred from the area 74 into the molding cavity generally designated 152 in FIG. 4.

When the material flows through the transfer and tear trim areas and into the cavity 152, in a mold having a long closing stroke such as the type with which the invention is concerned, the rubber would normally tend to continue to flow radially outwardly and onto and beyond the stamping. However, this is prevented because the inner surface 122 of the member 54 engages the outer surface of the inner axial flange 30, thereby forming a sliding flash barrier. Accordingly, in FIG. 4, for example, it will be seen that the tendency of the material to leak outwardly has been eliminated by engagement of these parts and the formation of a flash barrier.

Referring now to FIG. 5, further downward movement of the mold is shown, with the prep being largely but not completely transferred from the storage area 74, and with the land 120 on the movable member 54 being engaged with the stamping flange 28, that is, being "bottomed out" thereon. At this point, however, the pressing member 56 has not moved fully downward, and accordingly the cavity is not completely filled. However, the force of the spring package 62 continues to act downwardly on the rubber material, forcing it through the transfer areas and completely filling the molding cavity 152 thereof with the material and imparting the final shape to the seal or other molded product.

As shown in FIG. 6, when this operation is complete, there may be a certain residue of rubber left in the prep but the mold cavity has been fully filled, with the pressure in the cavity being determined by plunger movement and the force of the spring package 62. As pointed out above, if the mold elements were to "bottom out" together, the mold might not be completely filled in the case of an undersized "prep", or might be overfilled and caused to flash, with the flash barrier not sealing fully in the downward position with respect to the stamping.

In the instant case, this does not occur, because the pressing member or plunger 56 descends to the maximum possible extent. This is true even though a certain amount of flexibility in its final resting position is insured by the provisions of the spring 62. Likewise, a uniformly high but not excessive pressure can be maintained on the rubber in the cavity when the part is formed in this manner.

Referring now to FIGS. 7, 8 and 9, it will be noted that the barrier-forming surface 122 engages only the axially inner end of the stamping flange 30 when the mold stroke begins. However, a fair amount of rubber may already be in the molding cavity at this time, as shown in FIG. 4, for example.

FIG. 8 shows the continuation of the flash barrier by mutual engagement of the surfaces prior to completing the movement stroke of the mold, and FIG. 9 shows that the radial flange 28 is being coined by the land 120 of the mold member 54 when the member 54 bottoms out. This coining action insures that there is a good flash barrier or "pinch off" of rubber in this area.

It will be understood in this connection that the flash barrier initially formed need not be extremely tight, because relative sliding motion is still provided for. If this fit were too tight, the part would be difficult to remove from the mold. However, in the instant case, this should be a close tolerance, sliding fit, but it is not one which is required to withstand large hydrostatic pressures in view of the fact that the final seal made between the land 120 and the flange 28 is the only seal which will actually be exposed to extremely high pressures. This is because the mold will not be fully filled and be required to offer high pressure resistance to the inflow of additional molding material until the stroke of the plunger member 56 is virtually complete.

Referring now to another aspect of the invention, it will be noted that the molding cavity 152 is very long as a consequence of its having to form the seal with the thin, axially deep cross-section such as that shown in FIG. 2. As a consequence of this construction, the need for a mold which is able to form a flash barrier over a long stroke is of great importance. Because of the volume of the cavity, its cross-section, and the length of time required to move the rubber from the storage area to the cavity, it is essential that the flash barrier be established early and be maintained throughout the stroke. The combination of the movable flash barrier and the resiliently biased plunger or rubber feeding unit provides the long stroke which is necessary and still provides a construction which is not unduly sensitive to the size of the prep. In this connection, it will be realized that the force applied to filling the cavity can be controlled by the springs, and if the prep weights are somewhat high, the tendency to flash will not be excessive because the excess rubber will merely remain in the storage area. By the same token, the flash barriers which are provided insure that the cavity pressure will be maintained up to a desired level, but that this pressure level will not be exceeded.

The formation of parts of the type shown in FIG. 2 is an advantage of the present invention also, inasmuch as such parts may be made in a single piece rather than being made into separate, individual pieces requiring a built up or assembled construction.

According to the present invention, a preliminary or movable flash barrier is formed during mold closing, and this flash barrier is then supplemented by a second or final, high pressure flash barrier which becomes effective when the flash barrier establishing member bottoms out and coins the radial surface of the stamping flange. Although not strictly necessary, a curl or flange 32 formed with and depending from the end of the flange 30 may be provided if desired so that the engagement of the flash barrier surface 122 with the inner surface of the flange 30 can be facilitated. In the embodiment of FIG. 2 such a unit is shown, whereas, in the embodiments of FIG. 3 and following, a cut but not curled unit is shown. At any rate, the provision of a reduced diameter flange or partial flange in this area insures centering of the casing and improves reliability of the process.

According to the invention, the axial flange 30 is used not only to establish a flash barrier but also to provide a large bonding surface so that the body 28 of the seal may be firmly attached to the casing portion 22.

Seals made by the apparatus of the invention have provided outstanding performance in use as well as economy of manufacture, and the process has provided flash free parts which can be made economically at relatively reduced cost while maintaining high quality control. The separation or trimming of the parts is inherently accomplished by mold opening, and the finished parts may be removed from the mold without the requirement of subsequent operations being performed.

A preferred form of seal made by the apparatus of the invention is a multiple lip seal having one primary lip and two or more excluder or dust lips spaced closely apart from each other and spaced widely apart from the primary lip. In the preferred form, the seal body is bonded to the body mounting flange along a opposite to that along which the flash barrier was formed, and the overall length of the seal body is two or more times the axial length of the casing. The space between the two lips areas is also significantly greater than the entire axial extent of the casing. The radially inner axial flange has a lesser axial extent than the outer axial flange, but the inner flange has a length which is related to the length of mold closing stroke required. The axial extent of the radially outer axial flange is determined by the length of the inner flange in addition to whatever length is required so that the primary seal lip will lie inside the axial confines of the stamping.

Whereas the normal use of the molding apparatus of the invention is in manufacturing rubber-containing articles, the apparatus is also useful in molding other thermosetting materials, and for molding thermoplastic material if this is desired for some reason. The casing element is normally a steel stamping but it may be formed by any suitable method and may be made from suitable metals, alloys or other relatively rigid materials, such as composite or reinforced plastics or the like.

It will thus be seen that the present invention provides a novel molding apparatus having a number of advantages and characteristics, including those pointed out above and others which are inherent in the invention. A preferred embodiment of the invention having been described by way of illustration, it is anticipated that changes and modifications of the described apparatus, methods and articles will occur to those skilled in the art, and that such changes and modifications may be made without departing from the spirit of the invention or the scope of the appended claims.

We claim:

1. An apparatus for molding an article having a body portion formed from a moldable material and bonded to a relatively rigid casing element having axially and radially extending flange portions and a portion thereof which is adapted to be inserted into the cavity-forming part of said molding apparatus, said apparatus comprising, in combination, a first mold member having means thereon for receiving a prepared portion of a moldable material from which said body of said article is to be formed, a plurality of surfaces formed on said first mold member and at least partially defining the shape of a cavity in which said article is to be formed, and an insert support surface formed on said first mold member, said surface being adapted to receive and support a portion of said insert element, a second mold member mounted for reciprocable movement along a given axis between open, intermediate, and closed positions, said second member including a radially inwardly directed flash barrier-forming surface and contoured surface portions defining the contours of another portion of said cavity in which said article is to be formed, said barrier-forming surface on said second member being adapted to engage an exterior portion of said axially extending flange of said casing extending generally parallel to the movement axis of said mold member during movement thereof, and a land element on said second mold member for engaging a radially extending portion of said insert element in fluid tight relation, the shape of said article-forming cavity being completely defined when said second member is in said closed position thereof, when said insert is resting on said support portion of said first mold member whereby the axially extending portion forms a part of the cavity, and when said radial extending portion of said insert is engaged by said land portion, and a third mold member including surfaces cooperating with said first member in one position thereof to define a region for receiving a charge of moldable material, said third member having a face portion adapted to engage said prepared charge of moldable material and move said charge of material into the interior of said molding cavity, a reciprocable mold plate and first and second resilient means disposed respectively between said plate and said second and third members, said plate being movable along said axis between open and closed positions and adapted, in the closed position thereof, to urge said first and second resilient means and said second and third mold members associated therewith into the closed positions thereof, said mold members and said resilient means being constructed and arranged so that, during downward movement of said second mold member, said barrier-forming surface thereof engages and travels along said exterior surface of said axially extending casing flange in fluid-tight relation, until a part of said second member engages said radial flange of said casing, and so that initial movement of said mold plate to said closed position moves said third member into contact with said moldable material and subsequent movement of said mold plate causes said third member to transfer said material into said molding cavity under a force regulated by said second resilient means.

2. An apparatus as defined in claim 1 wherein said casing element is a metal casing unit.

3. An apparatus as defined in claim 1 wherein said resilient first and second resilient means comprise stacks of Belville washer type springs.

4. An apparatus as defined in claim 1 wherein second and third mold elements are spaced from each other by only a working clearance and wherein means forming a fluid-tight seal therebetween are also provided.

5. An apparatus as defined in claim 1 wherein said flash barrier forming surface lies on a radially inwardly directed axially extending portion of an element on said second mold member for said engagement with said exterior of said axially extending portion of said casing, said element further including a radial surface extending from one axial end of said axial surface, said radial surface also having a land formed thereon for engagement in fluid tight relation with said radial flange of said insert.

6. An apparatus as defined in claim 1 which further includes surfaces defining a scrap forming cavity and also includes opposed closely spaced apart cooperating surfaces defining a substantially circumferentially continuous material transfer passage of thin cross-section lying between said scrap forming cavity and said article forming cavity, said passage, when filled with said moldable material, forming a tear trim portion of said molded article.

7. An apparatus as defined in claim 6 wherein said scrap forming cavity is defined by surfaces on said second and third members which define shoulders adjacent said passage, whereby an area of radially increased cross-section lies just axially spaced apart from said passage of thin cross-section, whereby relative motion of said mold parts in a predetermined direction will serve to separate said scrap portion from said article by tearing said scrap material from said finished article within said tear trim area.

8. A molding press for insert molding of articles comprising a stiff insert and a portion made from a charge of moldable material, said apparatus comprising, in combination, upper and lower plates adapted to be moved between open and closed positions, and a die set positioned between said plates, said die set including a core member having surfaces thereon defining a portion of a cavity in which a molded part will be formed and a surface adapted to receive and support said insert having portions extending into the cavity, said core member also including a means defining the portion of an area for receiving a charge of curable material and portions defining a part of a scrap forming cavity, a second mold member having surfaces serving to define a second portion of said article forming cavity and a second portion of said scrap forming cavity, said second mold member also including a radially inwardly directed means for engaging the exterior of a portion of said insert received within said mold and cooperating with said insert portion to form an axially movable flash barrier, said second mold part also having means for cooperating with said insert to form a second, stationary flash barrier on an angularly related surface of said insert, a third mold member adapted to reciprocate relative to said first and second members and having one surface portion adapted to engage a portion of said charge of moldable material and move said material from said receiving area through said scrap forming cavity and into said article molding cavity, said first and third elements also including surfaces lying opposite each other in the closed position of said mold and serving to define a slightly spaced apart substantially circumferentially continuous passage of reduced cross-section and separating scrap forming area from said article forming cavity, said second and third mold members being resiliently urged, in the closed position of said molding apparatus, towards said first member, by separate sets of resilient means interposed between portions of said second and third members and portions of said top mold plate and means for applying a force to said upper and lower plates for moving said plates between said open and closed positions thereof.

9. A molding press as defined in claim 8 in which first and second spring sets disposed respectively between said plate and said second member and between said upper plate and said third member to urge said second and third members towards the first member, said unit also including surfaces defining in the closed position of said mold parts a pair of shoulders, whereby when said molding members are moved relative to each other said cured moldable material will separate along said area of reduced cross-section.

10. A molding press as defined in claim 8 in which said separate sets of resilient means comprises a pair of Belville washer type spring packages.

11. A molding press as defined in claim 10 which further includes surfaces on said core member and on said second mold member which cooperate to define a scrap forming cavity, said core member and second member also including cooperating, spaced apart circumferentially extending surfaces cooperating in the closed position of said first and second members, to define an inlet passage to said article forming cavity, said passage, when filled with moldable material, forming a tear trim portion attaching the moldable material in said article forming cavity to the moldable material in said scrap forming cavity.

12. A molding press as defined in claim 11 wherein said core member and said second member include shoulders thereon for engaging said moldable material, said shoulders being arranged so that when said members are removed relative to each other, said scrap portion will be separated from said article portion in the area of said tear trim portion.

* * * * *